(12) United States Patent
Vermillion et al.

(10) Patent No.: US 9,187,165 B2
(45) Date of Patent: Nov. 17, 2015

(54) SYSTEMS AND METHODS FOR ATTITUDE CONTROL OF TETHERED AEROSTATS

(71) Applicants: Christopher R. Vermillion, Boston, MA (US); Benjamin W. Glass, Somerville, MA (US); Andrew D. Goessling, Boston, MA (US)

(72) Inventors: Christopher R. Vermillion, Boston, MA (US); Benjamin W. Glass, Somerville, MA (US); Andrew D. Goessling, Boston, MA (US)

(73) Assignee: Altaeros Energies, Inc., Somerville, MA (US)

( * ) Notice: Subject to any disclaimer, the term of this patent is extended or adjusted under 35 U.S.C. 154(b) by 75 days.

(21) Appl. No.: 13/621,537

(22) Filed: Sep. 17, 2012

(65) Prior Publication Data

US 2013/0075523 A1    Mar. 28, 2013

Related U.S. Application Data

(60) Provisional application No. 61/537,102, filed on Sep. 21, 2011.

(51) Int. Cl.
*B64B 1/50* (2006.01)
*B64B 1/00* (2006.01)

(52) U.S. Cl.
CPC .... *B64B 1/00* (2013.01); *B64B 1/50* (2013.01)

(58) Field of Classification Search
CPC .......... Y02E 10/723; B64B 1/44; B64B 1/50; B64B 1/66; A63H 2027/1066
USPC ...... 290/44, 55; 244/155 A, 153 R, 155 R, 33
See application file for complete search history.

(56) References Cited

U.S. PATENT DOCUMENTS

| | | | |
|---|---|---|---|
| 4,165,468 A | 8/1979 | Fry et al. | |
| 4,166,596 A | 9/1979 | Mouton, Jr. et al. | |
| 4,207,026 A | 6/1980 | Kushto | |
| 4,309,006 A | 1/1982 | Biscomb | |
| 4,350,897 A | 9/1982 | Benoit | |
| 4,350,898 A | 9/1982 | Benoit | |
| 4,350,899 A | 9/1982 | Benoit | |
| 4,450,364 A | 5/1984 | Benoit | |
| 4,470,563 A * | 9/1984 | Engelsman | 244/33 |
| 4,789,302 A | 12/1988 | Gruzling | |
| 4,832,571 A | 5/1989 | Carrol | |
| 5,836,738 A | 11/1998 | Finney | |

(Continued)

FOREIGN PATENT DOCUMENTS

| | | |
|---|---|---|
| EP | 0045202 | 2/1982 |
| EP | 0935068 | 8/1999 |

(Continued)

*Primary Examiner* — Philip J Bonzell
(74) *Attorney, Agent, or Firm* — Loginov & Associates, PLLC; William A. Loginov

(57) ABSTRACT

A control system for a tethered aerostat is provided, where up to two rotational and at least one translational degree of freedom are controlled to setpoints through the variation of tether lengths by an actuator system. The term tether includes a single tether, a tether group or a sub section of tether controlled by an individual actuator. Accurate rotational and translational control is essential for the successful operation of an aerostat under several applications, including surveillance, weather monitoring, and power generation. For a given use case, the controller can be constructed and arranged to manage the tradeoff between several key performance characteristics, such as transient performance, steady-state pointing accuracy, tether tension regulation, and power generation.

5 Claims, 4 Drawing Sheets

(56) References Cited

U.S. PATENT DOCUMENTS

| | | | |
|---|---|---|---|
| 6,382,904 B1 | 5/2002 | Orlov et al. | |
| 6,523,781 B2 | 2/2003 | Ragner | |
| 7,188,808 B1* | 3/2007 | Olson | 244/153 R |
| 7,275,719 B2* | 10/2007 | Olson | 244/155 A |
| 7,335,000 B2 | 2/2008 | Ferguson | |
| 7,582,981 B1 | 9/2009 | Meller | |
| 8,100,366 B2* | 1/2012 | Milanese et al. | 244/155 A |
| 8,539,746 B2* | 9/2013 | Ippolito | 57/200 |
| 8,624,421 B2* | 1/2014 | Ippolito | 290/55 |
| 2002/0040948 A1* | 4/2002 | Ragner | 244/153 R |
| 2007/0013196 A1 | 1/2007 | Chen | |
| 2007/0120004 A1* | 5/2007 | Olson | 244/10 |
| 2007/0120005 A1* | 5/2007 | Olson | 244/33 |
| 2007/0126241 A1* | 6/2007 | Olson | 290/55 |
| 2008/0048453 A1 | 2/2008 | Amick | |
| 2009/0033098 A1* | 2/2009 | Griffith et al. | 290/55 |
| 2009/0072092 A1 | 3/2009 | Griffith et al. | |
| 2010/0019091 A1 | 1/2010 | Milanese et al. | |
| 2010/0032947 A1 | 2/2010 | Bevirt | |
| 2010/0133385 A1* | 6/2010 | Olson | 244/155 A |
| 2012/0049533 A1* | 3/2012 | Kelly | 290/55 |

FOREIGN PATENT DOCUMENTS

| | | |
|---|---|---|
| WO | 2010006433 A1 | 1/2010 |
| WO | 2011012996 A2 | 2/2011 |

* cited by examiner

SYSTEMS AND METHODS FOR ATTITUDE CONTROL OF TETHERED AEROSTATS

RELATED APPLICATIONS

This application claims the benefit of U.S. Provisional Application Ser. No.61/537,102, filed Sep. 21, 2011, entitled SYSTEMS AND METHODS FOR ATTITUDE CONTROL OF TETHERED AEROSTATS, the entire disclosure of which is herein incorporated by reference.

FIELD OF THE INVENTION

The present invention relates to control systems and methods of tethered aerostats.

BACKGROUND OF THE INVENTION

Moored (tethered) aerostats have had widespread use in several applications, including surveillance, advertising, and weather monitoring, where the aerostat's stationary position and altitude control allows its objective to be carried out successfully. There has been an increased desire to substitute tethered aerostats or kite-based systems for traditional wind turbines in order to deliver significantly more wind energy than a traditional turbine at a fraction of the cost. In all of these applications, it is desirable that the altitude of the aerostat be controlled and that the aerostat remains steady during operation. For wind energy generation applications, aerostat-based systems offer an advantage over kite-based systems due to the fact that they are based on well-established core technology and include a "lighter-than-air" (often helium) lifting body that provides upward force even in the absence of wind. Still, because such aerostats are often affected by aerodynamic as well as buoyant forces, poor control over attitude can disadvantageously lead to loss of dynamic stability. Furthermore, in applications such as wind energy generation, the performance of the system is contingent not only on altitude control but also on the ability for the aerostat to point in a desirable direction, where the direction that the aerostat points is referred to as its "attitude".

Prior systems have concentrated on altitude control for tethered aerostats, providing a configuration for which the aerostat remains stationary but is not controlled to a particular attitude. Furthermore, several concepts, such as the method and apparatus described in U.S. Pat. No. 5,080,302, filed Sep. 5, 1990, entitled METHOD AND APPARATUS FOR AERIALLY TRANSPORTING LOADS, by Hoke, provide for this stability by leading the tethers to points on the ground that are widely separated. This type of design requires an elaborate ground station for control of the aerostat altitude and requires an additional pivot at altitude for the aerostat to passively orient itself into the wind, a requirement that is essential for energy generation. Accordingly, there is a need for a system that provides control for a system effectively and efficiently by lessening the need for external control devices and/or sophisticated calibration algorithms, to control attitude of a tethered aerostat.

SUMMARY OF THE INVENTION

To overcome the disadvantages of the prior art, in accordance with an illustrative embodiment this invention employs two or more actuators, originating from a single actuator platform on the ground, to control the aerostat altitude and at least one independent attitude variable. This lessens need for additional control in terms of camera adjustment for surveillance and reduces the need for sophisticated calibration algorithms on weather instrumentation that is mounted on the aerostat. Furthermore, for power generation applications, altitude control allows the aerostat to seek the optimal altitude for wind strength, without exceeding its rated capacity, and attitude control allows for further optimization of power generated, while also providing a mechanism for ensuring system stability when aerodynamic forces dominate buoyant forces.

A control system for a tethered aerostat includes an actuator system for accurate rotational and translational control of the aerostat. In an illustrative embodiment, a tethered aerostat is connected to an actuation platform via tethers. The actuation platform includes at least two independent actuators that control the release speeds of the tethers attached to the actuators. Controlling the release speeds of the tethers thereby controls the tether length. Illustratively, the aerostat is connected to the actuator system via at least two tethers. The number of tethers is highly variable and typically includes at least two in an illustrative embodiment. According to the illustrative embodiment, each tether terminates at a single actuator on the actuation platform which has a control unit for providing input to the actuators in order to achieve the desired tether release rates. The control unit provides commands to the actuators in order to regulate at least two independent position and/or orientation (attitude) variables.

BRIEF DESCRIPTION OF THE DRAWINGS

The invention description below refers to the accompanying drawings, of which.

DETAILED DESCRIPTION

Figure 1:
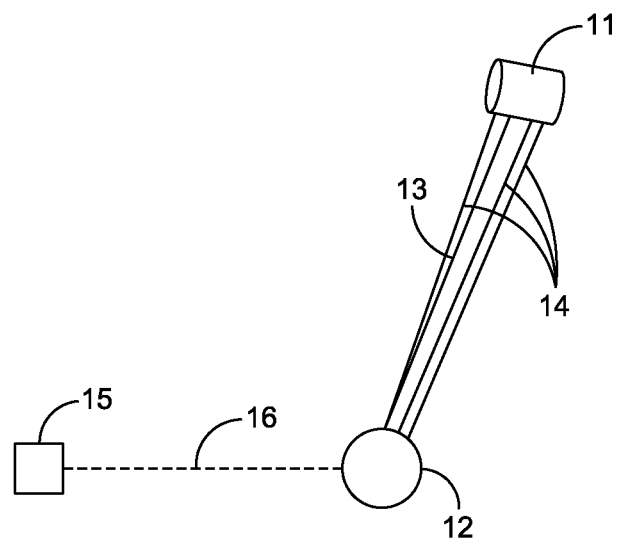
FIG. 1 is a schematic diagram of the overall system architecture for an aerostat as tethered to an actuation platform, according to an illustrative embodiment.

According to various illustrative embodiments, a control system for a moored (or tethered) aerostat varies the tether lengths through an actuator system. The term "tether" as used herein refers to a single tether, a group of tethers or a subsection of tether controlled by an individual actuator or any other combination of tethers known to those ordinarily skilled in the art. The fabric and materials used for tethers is highly variable within ordinary skill. Accurate rotational and translational control of an aerostat is highly desirable for the successful operation of an aerostat. There are several applications for aerostats, including surveillance, weather monitoring and power generation, among others. The controller manages the tradeoff between several key performance characteristics, such as transient performance, steady-state pointing accuracy, tether tension regulation and power generation, as described in greater detail hereinbelow. Furthermore, in applications such as wind energy generation, the performance of the system is contingent not only on altitude control but also on the ability for the aerostat to point in a desirable direction, where the direction that the aerostat points is referred to as its "attitude". For useful background information relating to various embodiments of aerostats and energy-producing turbines, refer to commonly assigned U.S. application Ser. No. 12/579,839, filed Oct. 15, 2009, entitled POWER-AUGMENTING SHROUD FOR ENERGY-PRODUCING TURBINES, by Benjamin W. Glass, the entire disclosure of which is herein incorporated by reference.

In an illustrative embodiment, the system described herein uses extremum seeking control for determination of an altitude setpoint, in which the altitude of the system is periodically perturbed and power output is evaluated. In the embodiment, the altitude setpoint is adjusted in a direction in which power output is observed to be increasing.

In another illustrative embodiment, the system described herein is a model predictive control (MPC) system for determination of setpoints, in which a trajectory of setpoints is computed in order to deliver optimal performance over a receding horizon. For example, for a horizon length of N steps, which comprises NT seconds, where T is the controller time step (in seconds), the MPC system is set up to minimize a cost function:

$$l(x(k), r(k)) = u \sum_{i=k}^{k+N-1} g(x(i|k), r(j|k))$$

Subject to constraints:
$x(j|k) \in X, i=k \ldots k+N-1$
$r(j|k) \in R, i=k \ldots k+N-1$ where x represents the state of the system and r represents the manipulated variables (in this case, pitch, roll, and altitude setpoints) to the system. The stage cost, g, can consist of as many terms as desired to properly characterize the performance properties of the system that are to be traded off. Furthermore, as many constraints as appropriate can be incorporated to maintain the optimization problem as feasible. In an illustrative embodiment, the stage cost consists of a term for power usage, another term for transient performance, and a state constraint for tether tension.

In order to limit the amount of energy consumed by the actuator system, and ensure that the actuator system does not remain continuously active during the course of operation, the various illustrative embodiments are constructed and arranged such that the controller incorporates a deadband. In this deadband the control signal is equal to approximately 0 whenever certain prescribed signals are sufficiently close to their desired values. Taking the control input (i.e., tether release rate) at discrete time instant k as u(k) and a generic performance variable at time instant k as y(k), this deadband is implemented as an adjustment of the raw control input, $u^{raw}$ (before the deadband is applied) as follows:

$$u(k) = \begin{cases} u^{raw}(k), & |y| > y^{deadband} \\ 0, & \text{otherwise} \end{cases}$$

In general, there is no limit to the number of variables on which the deadband can apply.

According to an illustrative embodiment, a hysteresis loop is incorporated within the controller, such that the deadband entry criteria differs from the deadband exit criteria. The application of the deadband is modified as follows, taking u(k) as the control input, in accordance with the illustrative embodiment:

$$u(k) = \begin{cases} u^{raw}(k), & |y| > y^{deadband} \\ 0, & \text{otherwise} \end{cases}$$

if $|u(k-1)| = 0$ $$u(k) = \begin{cases} u^{raw}(k), & |y| > y^{deadband} \\ 0, & \text{otherwise} \end{cases}$$

A power generation unit can be incorporated within or otherwise connected to the aerostat, which consists primarily of a turbine and generator. The generation unit can also include additional signal conditioning equipment (such as step-up transformers, for example), to transform the generated electrical signal to a higher voltage signal for the purpose of transmission to a base station. A conductive element can be included in one of the tethers used for control, or an additional tether can be provided for transmission of power to the base station. The energy-generation embodiment is applicable to the various illustrative embodiments described hereinabove.

Figure 2:
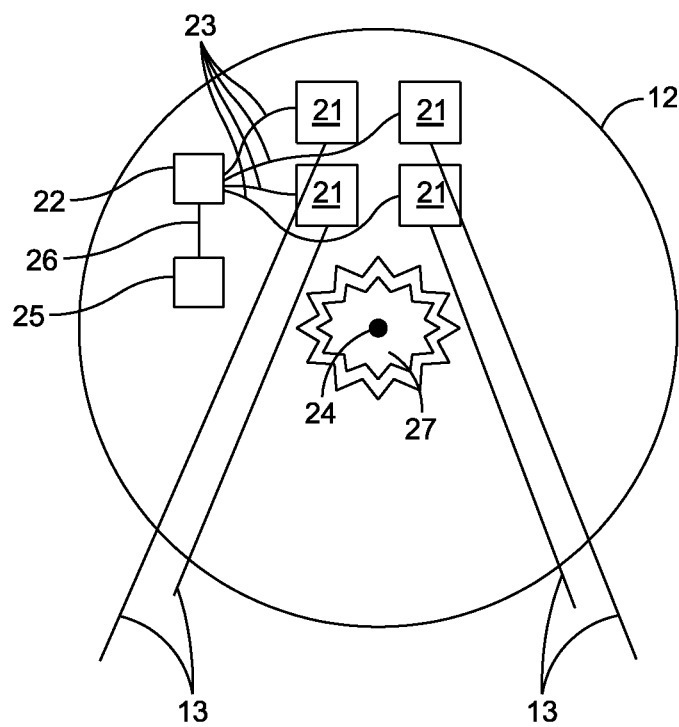
FIG. 2 is a schematic diagram of a top view of an actuator platform of the system, according to the illustrative embodiment.
Figure 3:
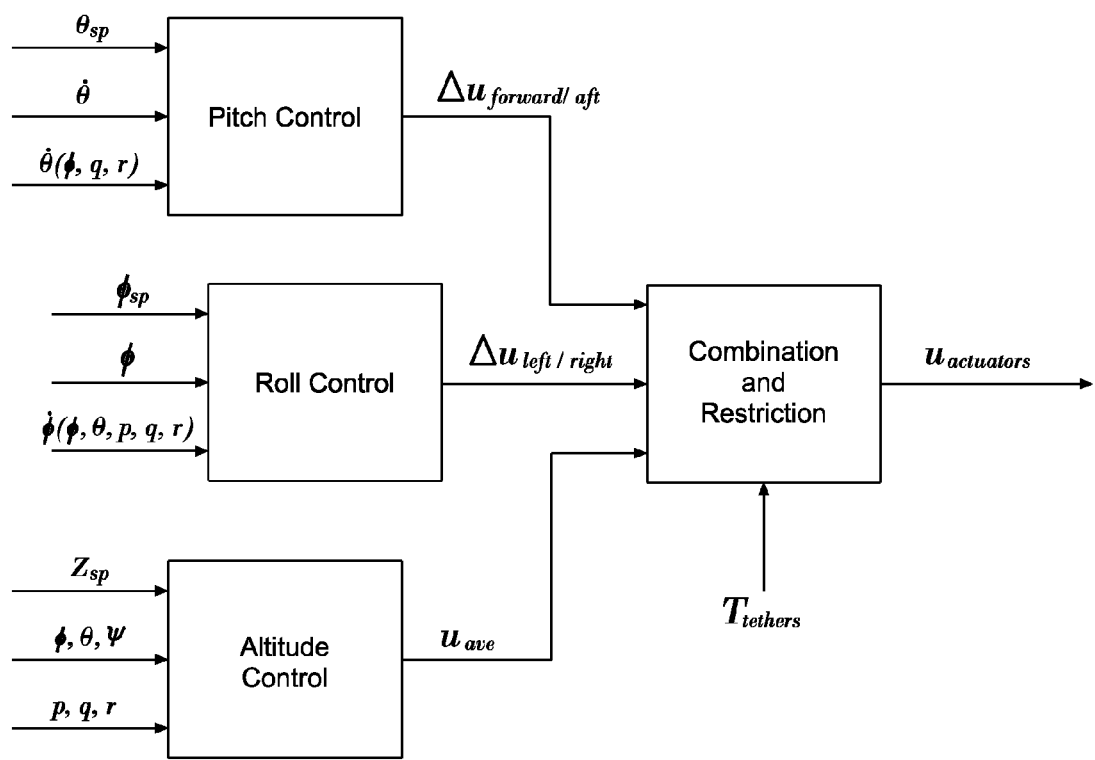
FIG. 3 is a block diagram of the various inputs and areas of control for the combination and restriction process, according to the illustrative embodiment.

In accordance with an illustrative embodiment, a tethered aerostat 11 shown in FIGS. 1 and 2 is secured to an actuation platform 12 having at least 2 independent actuators 21 that control the release speeds of the aerostat tethers that are attached to the actuators. Controlling the release speeds of the tethers thereby controls the tether length. The aerostat 11 is connected to the actuator system via tethers 13. As shown in FIG. 2, each tether terminates at a single actuator. A control unit 22 provides inputs (voltages or other inputs known in the art) to the actuators 21 to achieve desired tether release rates at the actuators. The control unit 22 provides commands via communication links 23 to the actuators 21 to regulate at least two independent position and/or orientation variables, such as pitch angle and attitude. In an illustrative embodiment, the actuators can be electric winches. The actuation platform 11 is free to rotate about a pivot axis 24. In an illustrative embodiment, for example as shown in FIG. 3, the control system drives pitch angle, $\theta$, to a feasible setpoint, $\theta_{sp}$, drives roll angle, $\phi$, to a feasible setpoint, $\phi_{sp}$ and regulates altitude, z, to a feasible setpoint, $z_{sp}$. In the illustrative embodiment shown in FIG. 3, separate pitch, roll, and altitude controllers determine commands for the difference between the forward and aft tether release rates ($\Delta u_{forward/aft}$), the difference between the left and right tether release rates ($\Delta u_{left/right}$), and the average tether release rate ($u_{ave}$), respectively. These separate commands are then aggregated in a subsequent block via a relationship such as:

$u_{front,left} = u_{ave} + \Delta u_{forward/aft} + \Delta u_{left/right}$ $u_{front,right} = u_{ave} + \Delta u_{forward/aft} - \Delta u_{left/right}$ $u_{aft,left} = u_{ave} - \Delta u_{forward/aft} + \Delta u_{left/right}$ $u_{aft,right} = u_{ave} - \Delta u_{forward/aft} - \Delta u_{left/right}$ where u represents a tether release rate command.

An optional remotely-operated host computer 15 allows the user to interact with the system via a communication link 16, which can be wired or wireless. According to an illustrative embodiment, the communication link of 16 is bi-directional, allowing a remote user to input commands to the actuator platform 12 and receive data (telemetry) from it. The communication link 16 can also be uni-directional to allow for uni-directional flow of data from the actuator platform to the remote user and vice versa.

An additional data processing device 44 can be provided, such as a microcontroller or rapid prototyping board, that receives and aggregates the data from the measurement units on the aerostat 11 and sends this data through the conductive cable element to the control unit 22 via the aforementioned communication link 14. See FIG. 4 for example. This aerostat data processing device 44 can include filters (for example for extracting important information from noisy signals or blending several measurements), as well as algorithms for prioritizing and timing the dissemination of data packets through the conductive tether to the control unit 22.

A wind measurement unit 42 can be employed to measure wind velocities and communicate these measurements to the base station control unit 22 via the communication link 14, in accordance with ordinary skill.

Figure 4:
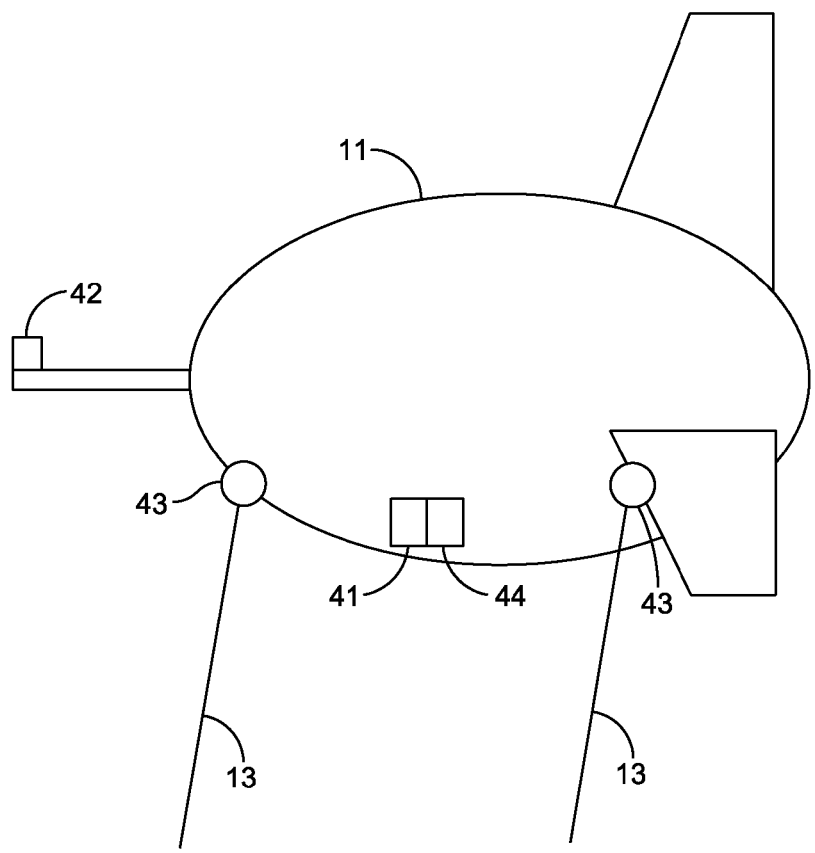
FIG. 4 is a diagram of a side view of an aerostat and its various components, according to the illustrative embodiment.
Figure 5:
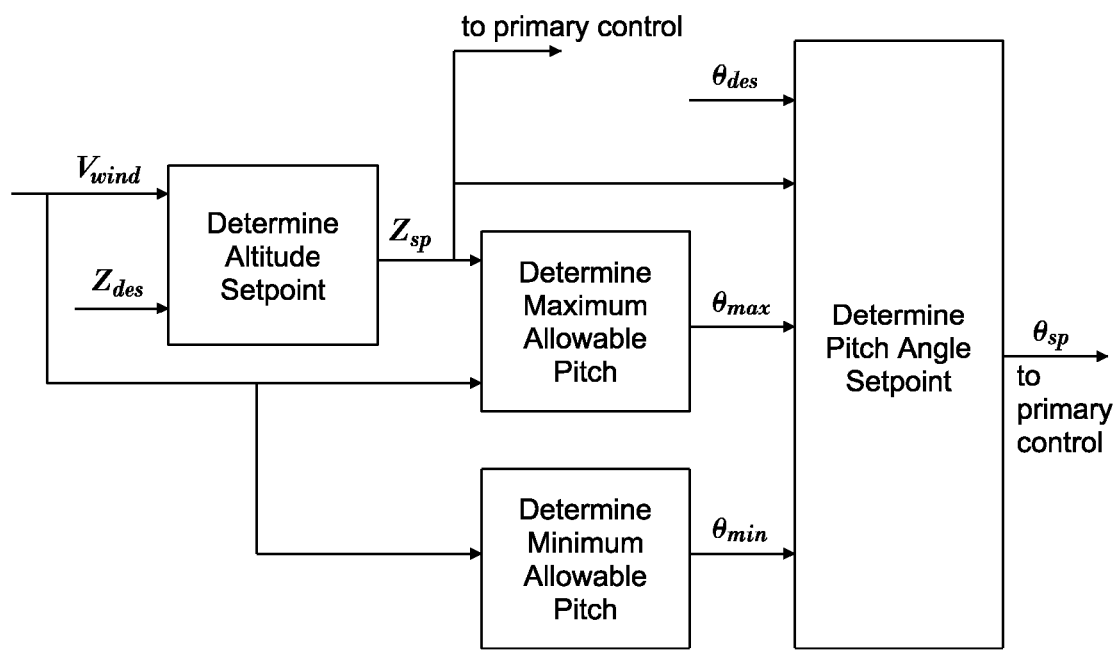
FIG. 5 is a block diagram of the various stages for determining setpoints of a reference governor in accordance with the illustrative embodiment.
Figure 6:
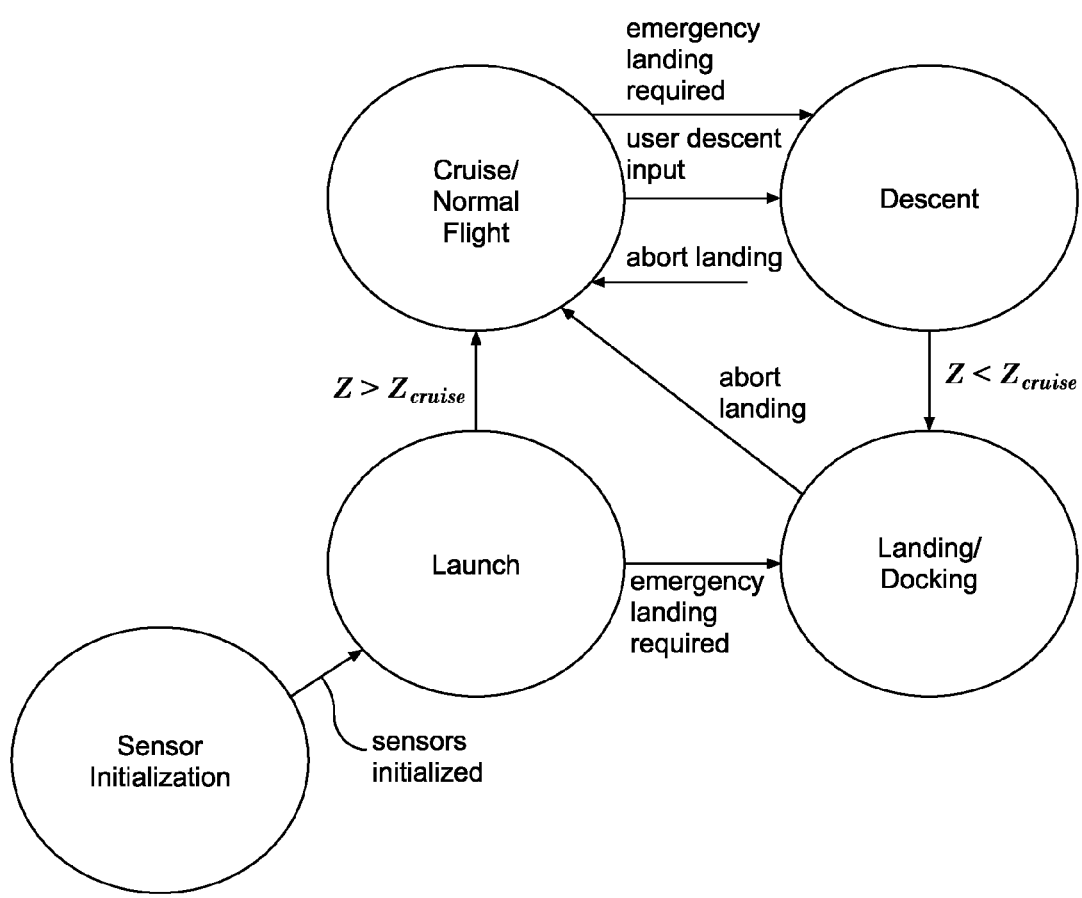
FIG. 6 is a flow diagram of the modal control for operation of the main controller, in accordance with the illustrative embodiment.

A tension measurement device 43 can be employed, such as a load cell or strain gauge, to measure the tension within at least one tether and communicate this measurement to the control unit 22 via the communication link 14. As illustrated in FIG. 4, this tension is measured at the point of attachment between the tethers and shroud. In further embodiments, the tension is measured at the base station through load cells that measure the reaction between the actuators and base station.

The "Combination and Restriction" element or process in FIG. 3 is constructed and arranged to limit tether release commands whenever tether tensions fall below a specified threshold. In an illustrative embodiment, this block limits both forward release rate commands to a maximum of approximately 0, indicating that tether can be pulled in but not released, any time that all forward tether tensions fall below the threshold. The combination and restriction process also restricts both aft tether release rate commands to a maximum of approximately 0 any time that all aft tether tensions fall below the threshold. In another illustrative embodiment, the combination and restriction block limits both forward release rate commands to a maximum of approximately 0 any time that the average forward tether tension falls below the threshold and limits both aft tether release rate commands to a maximum of approximately 0 any time that the average aft tether tension falls below the threshold. In another illustrative embodiment, the combination and restriction block includes a tether tension controller that computes separate tension-based control input commands for each tether. In the illustrative embodiment, the final control commands are taken as the minimum of the tension-based control input commands and the original input commands, $u_{front,left}$, $u_{front,right}$, $u_{aft,left}$, and $u_{aft,right}$, derived from altitude, pitch and roll controllers.

As shown in FIG. 4, an inertial measurement unit (IMU) 41, can be included in or on the aerostat 11, which measures roll, pitch, and yaw angles and their rates of change. A communication link 14 is provided (for example, a hard-wired or wireless communication), which communicates measured attitude and rate measurements between the aerostat 11 and the control unit 22.

A pivot axis 24 is defined on the actuator platform 12, which includes a heading sensor 25 such as a magnetometer, and a communication link 26 between the heading sensor and the control unit 22. A rotational actuator 27 is also optionally employed and can be used to actively alter the heading of the actuator platform. The heading reading from the sensor 25 is used in conjunction with the shroud heading from its IMU 41 of the aerostat 11 to compute the appropriate control input to the rotational actuator 27.

The systems and methods herein also support constrained optimization-based determination of setpoints. According to an illustrative embodiment, the control unit 22 for the main invention does not receive setpoints input by an external user but rather optimizes these setpoints internally via an optimal control technique. This advantageously allows users to trade off multiple performance objectives (for example, transient performance and tether tensions).

The foregoing has been a detailed description of illustrative embodiments of the invention. Various modifications and additions can be made without departing from the spirit and scope of this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. For example, the teachings herein are applicable to a wide range, size and type of aerostats without departing from the scope of the present invention. Shape and contour of the aerostat are highly variable so long as they include the control systems and methods described herein. Additionally, directional and locational terms such as "top", "bottom", "center", "front", "back", "above", and "below" should be taken as relative conventions only, and not as absolute. Finally, the placement and location of actuators and tethers are highly variable so long as they are in accordance with the teachings shown and described herein. Accordingly, this description is meant to be taken only by way of example, and not to otherwise limit the scope of this invention.

What is claimed is:

1. A system for controlling a tethered aerostat, the system comprising:
    a base station including an actuation platform having an actuator system that is secured to the tethered aerostat via a plurality of tethers;
    the actuation platform having at least two actuators that each respectively control release speeds of at least some of the plurality of tethers, the actuation platform is configured to freely rotate about a pivot axis;
    a control unit that provides input to at least one of the at least two actuators to control the release speed of the controlled tethers, the control unit adjusting tether release speeds in order to achieve accurate rotational and translational control of the aerostat, and including the control of at least two translational and/or rotational variables, the control unit comprising separate pitch, roll, and altitude controllers that determine a difference between forward tether and aft tether release rates, a difference between left tether and right tether release rates, and an average tether release rate; and
    a remote computer/microcontroller and uni- or be-directional communications link between the base station and the remote computer.

2. The system as set forth in claim 1 including a computer/microcontroller aboard the aerostat and uni- or bi-directional communications link between the base station and aerostat.

3. The system as set forth in claim 1 further including a sensor or sensors capable of measuring wind speed and/or direction.

4. The system as set forth in claim 1 further including sensors capable of measuring tension in the tethers.

5. The system as set forth in claim 1 including an energy generation device at the aerostat for transmitting electrical energy from the aerostat to the base station.

* * * * *